US010019019B2

(12) United States Patent
Sai (10) Patent No.: US 10,019,019 B2
(45) Date of Patent: Jul. 10, 2018

(54) DISTRIBUTED COMPUTING WITH CLOUD COMPUTED FEEDBACK TO PROCESS SENSORS

(71) Applicant: Honeywell International Inc., Morris Plains, NJ (US)

(72) Inventor: Bin Sai, Zuid Holland (NL)

(73) Assignee: Honeywell International Inc., Morris Plains, NJ (US)

( * ) Notice: Subject to any disclaimer, the term of this patent is extended or adjusted under 35 U.S.C. 154(b) by 45 days.

(21) Appl. No.: 15/296,134

(22) Filed: Oct. 18, 2016

(65) Prior Publication Data

US 2018/0107230 A1  Apr. 19, 2018

(51) Int. Cl.

| G01F 1/66 | (2006.01) |
|---|---|
| G01S 13/06 | (2006.01) |
| G05B 19/048 | (2006.01) |
| G05D 7/06 | (2006.01) |
| H04L 29/06 | (2006.01) |

(52) U.S. Cl.
CPC .................. *G05D 7/06* (2013.01); *G01F 1/66* (2013.01); *G01S 13/06* (2013.01); *G05B 19/048* (2013.01); *H04L 69/26* (2013.01); *G05B 2219/37371* (2013.01); *G05B 2219/45016* (2013.01)

(58) Field of Classification Search
CPC .. G05D 7/06; H04L 69/26; G01F 1/66; G01S 13/06; G05B 19/048; G05B 2219/37371; G05B 2219/45016
See application file for complete search history.

(56) References Cited

U.S. PATENT DOCUMENTS

| 2013/0097276 A1 | 4/2013 | Sridhar | |
|---|---|---|---|
| 2014/0207393 A1* | 7/2014 | Brusilovsky | G01F 1/66 |
| | | | 702/48 |
| 2015/0204712 A1* | 7/2015 | Krolak | G01F 25/0061 |
| | | | 702/94 |

* cited by examiner

*Primary Examiner* — Yuhui R Pan
(74) *Attorney, Agent, or Firm* — Jetter & Associates, P.A.

(57) ABSTRACT

A process control system for controlling an industrial process includes a cloud-computing dependent ($C^2D$) radar level gauge or ultrasonic flow meter ($C^2D$ sensor device) including a sensor, transducer, communications unit, with limited hardware/software incapable of calculating an accurate level calculation or high accuracy gas flow rate. A bus couples the sensed data from the $C^2D$ sensor device to an IP communications unit that outputs IP protocol data. The cloud computing system is coupled by an IP network to receive the IP protocol data and includes a processor executing advanced data processing algorithms which provides a second part of the $C^2D$ sensor device including processing the IP data to generate a remote computational result including the accurate level calculation/high accuracy gas flow rate. The cloud computing system feeds back the remote computational result to a process controller coupled to an actuator that controls processing equipment for automatically tuning the industrial process.

14 Claims, 4 Drawing Sheets

DISTRIBUTED COMPUTING WITH CLOUD COMPUTED FEEDBACK TO PROCESS SENSORS

FIELD

Disclosed embodiments relate to industrial sensing and process control using such sensing devices.

BACKGROUND

Process control systems for industrial processes, whether distributed control system (DCS) or supervisory control and data acquisition (SCADA) systems, generally include one or more process controllers communicatively coupled to at least one host (e.g., an operator workstation) and to one or more process control devices (e.g., field devices) configured to communicate via analog, digital or combined analog/digital communication signals and/or protocols. Such process control systems are commonly used in oil and gas, chemical, pharmaceutical, pulp and paper manufacturing and petroleum processes. The field devices can comprise device controllers, valves, valve actuators or positioners, switches, transmitters (e.g., temperature, pressure, level, flow rate, or chemical composition sensors), performing functions within the process control system such as actuators opening and/or closing valves and gauges or sensors measuring process parameters. The process controller receives signals indicative of process measurements made by the field devices and/or other information pertaining to the field devices, uses this information to implement a control routine, and generates control signals over buses and/or other communication lines to the field devices such as actuators to control the operation of the processing equipment of the process control system.

In process control systems there are relatively low complexity gauges and meters and relatively high complexity level gauges or ultrasonic flow meters. The low complexity gauges or meters can include temperature sensors (e.g., a thermocouple or a thermistor) and pressure sensors which only provide at most a look-up table or solve a simple equation for providing the transducer function to report a temperature value or pressure value as an electrical signal typically between 4 to 20 mA, and do not provide any data processing. For such low complexity gauges or meters, most of the data processing is generally performed locally in the device with a relatively less complex processor or by a separate processing unit remotely located in the vicinity of the field device, or even by computers within the control room of the plant (operator stations).

The relatively high complexity level gauges or ultrasonic flow meters are much more complex than the low complexity gauges or meters. For example, a relatively high complexity level gauge performs a level calculation at high precision or a relatively high complexity ultrasonic flow meter provides actual gas velocity profiling on flow cross sections. Since the measuring conditions such as turbulences can occur anytime, this makes the flow computation even more complicated, which might necessitate multiple modelling algorithms, and even call for recalibration of the ultrasonic flow meter equipment, which is to be carried out by servicing performed after shutting down.

The relatively high complexity gauges or ultrasonic flow meter equipment is expensive (e.g., about $5 k to $15 k each) and is all inclusive. Such relatively high complexity level gauges and ultrasonic flow meters include an embedded processor, such as a digital signal processor (DSP), Field-Programmable Gate Array (FPGA), microcontroller unit (MCU) or microcomputer that needs to be fairly powerful to perform the needed heavy and complicated mathematical computations. Their onboard memory must also be large enough to handle various data storage and processing, and their physical size is also large. Thus, the power consumption for these relatively high complexity radar level gauges and ultrasonic flow meters is high and a formidable challenge for future firmware changes or upgrading.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize inefficiencies caused by performance degradation of subsystems and/or components in the field level of an industrial plant commonly occur at a system level in operations for industrial process control systems (or plants) including for example oil or gas storage tanks and/or pipelines, refineries and petrochemical facilities, aerospace and transportation systems. Improvement and upgrading in such systems and/or subsystems generally requires the redesign of the hardware and software systems to meet the new requirements. This is true for radar level gauges and ultrasonic flow meters that have onboard digital signal processing (DSP) computing capability. Moreover, some more advanced processing algorithms (e.g., gas velocity profiling on flow cross sections for ultrasonic flow meters) cannot be implemented in existing hardware board due to one or more of limited memory capacity, insufficient processing speed and high power consumption. Furthermore, embedded firmware coding is processor dependent, non-intuitional and prone to bugs.

Disclosed embodiments solve these respective problems by providing distributed computing arrangement comprising a radar level gauge or ultrasonic flow meter that remotely offloads advanced algorithm-based data processing it needs by utilizing secured digitalization and the Internet of things (IIoT) enabled by an Internet Protocol (IP) network connection to work together with a cloud computing system that provides this need. The cloud computing system runs the advanced algorithms which conventional radar level gauges and ultrasonic flow meters require an onboard DSP to run such advanced algorithms. Disclosed radar level gauges and ultrasonic flow meters are referred to herein as cloud-computing dependent ($C^2D$) ultrasonic flow meters and radar level gauges, and collectively as "$C^2D$ sensing devices". Using cloud-based computation enables more sophisticated tracking and predication modelling which can take full consideration of the reality of real-time measurement conditions, that then ensures continuous, near-real time and accurate calculation of the liquid level for the radar level gauge or gas flow rate for the ultrasonic flow meter.

Disclosed distributed computing thus separates the onboard task of mathematical computation (calculation), modeling and/or calibration which may be termed part 2 (or the back-end) from the sensing device, from part 1 (front-end) of the sensing device that is configured for operation in the device layer of the plant or of the process. Disclosed $C^2D$ sensing devices provide only part 1 to perform sensing, transducing and only basic functionality to output electrical or acoustic sensed data, utilizing at most basic data pre-processing, and for communications including for transmitting sensed data. The $C^2D$ radar level gauge is incapable of performing an accurate level calculation and the C²D ultrasonic flow meter is incapable of accurately determining the actual gas velocity profile needed for calculating a high-precision gas volumetric flow rate or mass flow rate (which needs input from a density meter).

For radar level gauging an "accurate level calculation" is defined herein to be an accuracy ≤|1 mm| to generally meet or have better than the accuracy defined by the maximum permissible error (MPE) in legal metrology for custody transfer. A standard in this regard is made by OIML (International Organization of Legal Metrology) R85, 2008. For ultrasonic flow metering the "actual gas velocity profile" is the base data used for calculating the flow rate, since it integrates gas velocity profiles in a cross section. The calculated flow rate is not simulated, but is rather a real-time calculation. Profiling actual gas flow rate dominates the ultimate flow rate accuracy which is defined is defined herein to be a "accurate flow rate" of ≤|1%| to generally meet the legal metrology standard OIML R137 where class 0.5% or 1% flow rates are regarded as accurate calculation in the industry.

The cloud computing system improves the respective level calculation and flow rate calculation when generated by the C²D sensing device by at least a factor of 10 to achieve the accurate level calculation and accurate flow rate. In some cases the C²D sensing device is incapable of generating any level calculation or flow rate calculation.

One disclosed embodiment comprises a method of distributed computing for controlling an industrial process run in a plant. A C²D radar level gauge or an C²D ultrasonic flow meter is positioned directly exposed to processing equipment in a plant. The C²D device includes a sensor, a transducer, and communications including for transmitting sensed data from the sensor and limited hardware and software so that the C²D radar level gauge is incapable of performing an accurate level calculation and the C²D ultrasonic flow meter incapable of calculating a high accuracy gas flow rate. The sensed data is coupled over a bus from the C²D radar level gauge or ultrasonic flow meter to a communications protocol unit, such as an IP communications unit that converts the sensed data to IP protocol data.

The IP communication unit transmits the IP protocol data over an IP network to an online cloud computing system which includes a processor executing stored advanced data processing algorithms which provides a second part of the C²D radar level gauge or ultrasonic flow meter including processing the IP protocol data to generate at least one remote computational result comprising the accurate level calculation for the C²D radar level gauge or the high accuracy gas flow rate for the ultrasonic flow meter. The remote computational result is fed back through the IP network to a process controller coupled to an actuator that controls the processing equipment for automatically tuning at least one process parameter of the industrial process.

DETAILED DESCRIPTION

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

A disclosed C²D radar level gauge may include, for example, a radar gauge RF front-end transducer configured to operate at certain allocated frequency bands such as C, X, K, V, W bands. A disclosed C²D ultrasonic flow meter may comprise an ultrasonic transducer pair and data acquisition circuitry. The C²D device is directly exposed to the industrial process which can be hazardous, therefore intrinsically safety in its hardware (HW) is preferred in most applications.

As described above conventional ultrasonic flow meters and/or level gauge devices include both part 1 (front-end) and part 2 (back-end). Missing either (part 1 or part 2) will lead to malfunction of the ultrasonic fluid flow meter or radar level gauge as they will be unable to provide their intended use, so that disclosed C²D ultrasonic flow meters and/or C²D radar level gauge devices without cloud computing support will not provide their intended use/function. One advantage with such simplified functions for disclosed C²D ultrasonic flow meters and/or C²D radar level gauges in the front-ends is the C²D device's hardware will consume less energy (power) which enables an improved intrinsic safety design and less costs for functional upgrading via upgrading the remotely located part 2.

The cloud computing-based part 2 is the intelligent part that performs, for instance, level calculation for radar level gauges at high precision or actual gas velocity profiling on flow cross sections for ultrasonic flow meters. Since the measuring conditions for flow such as turbulences can occur anytime, this makes the computation even more complicated, which might need multiple modelling algorithms, and may even call for re-calibration of the equipment, which is to be carried out by service after shutting down. Significantly, distributed computing with cloud computed feedback to $C^2D$ devices can provide an online calibration without interrupting the process, since part 2 is performed remotely or quasi-remotely in a powerful multi-tasking computational engine in a cloud computing system (see cloud computing system 190 in FIG. 1 described below), such as a cloud-based server.

The cloud computing-based part 2 is also easier to get updated or upgraded or even changed completely to more sophisticated algorithms without making any change to the $C^2D$ device. There are other advantages to using separate parts, such as the prevention of illegal imitation/tear-down analysis, which commonly happens between competitors. High flexibility and easy maintenance, everything is available in cloud computing-based part 2, which do not need getting data from control rooms. Instead, cloud computing-based part 2 can provide calculated results to the control room.

The cloud computing system includes relatively more sophisticated algorithms for data analytics, processing and/or modeling which can be implemented without any limitation from the level gauge or ultrasonic flow meter with regard to the size of the onboard memory (e.g., flash memory or Static Random Access Memory (RAM)), the speed of the embedded processor, power consumption and requirements for complex DSP-chip dependent coding for algorithm implementation. Disclosed distributed data processing arrangements can also alleviate the restraint of power usage for intrinsic safety requirements so disclosed level gauges or ultrasonic flow meters can more easily meet the power budget. Moreover proprietary core algorithms needed to calculate the liquid level or fluid flow can be protected from illegal copy from the level gauge or ultrasonic flow meter and from the performing of reverse engineering.

Disclosed remote communications between the radar level gauges or ultrasonic flow meters and cloud computing system via an IP network connection will be more frequent with more data packets compared to conventional sensors and gauges, but this will generally not be a problem. On one hand the trend is that more bandwidth and frequency spectrum allocated for industrial systems, on the other hand, the data rate that industrial level gauges or ultrasonic flow meter devices require are not as high as some already widely supported devices, such as smartphones.

For example, a Honeywell FLEXLINE radar level gauge may have a relatively fast measuring rate of 10 Hz, at a data rate of approximately 160K bits/s. With Transmission Control Protocol (TCP)/Internet Protocol (IP) and Internet of Things (IIoT) protocols such as Message Queuing Telemetry Transport (MQTT) or Open Process Control Unified Architecture OPC UA, a data rate of 160 k bits/s is generally easily supported nowadays. Moreover, use of IIoT technologies can make disclosed level gauges and ultrasonic flow meters more expandable and interoperable, moving from onboard self-diagnostics to an integrated approach, which can perform big data analytics in the cloud to find optimal parameters for use in plant operations.

Figure 1:
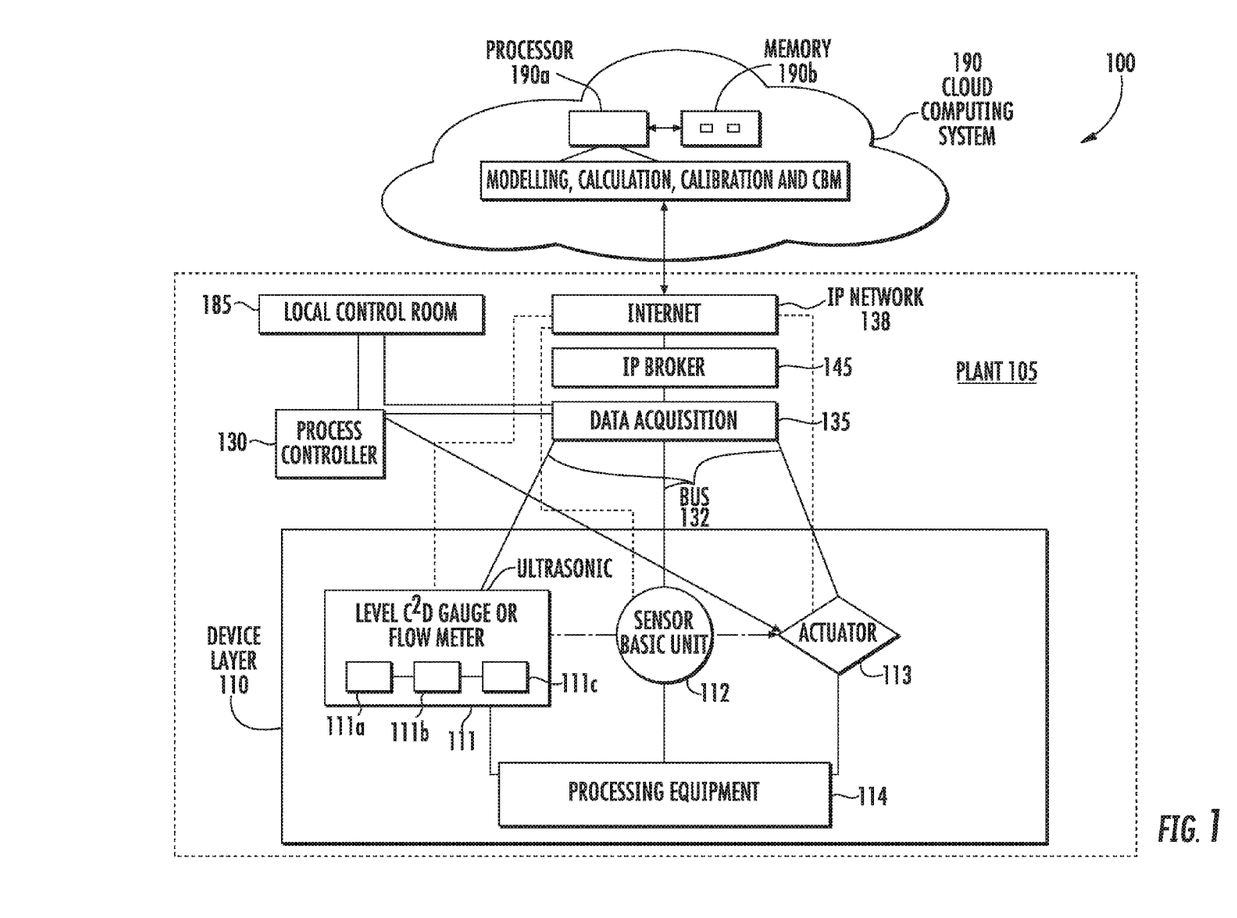
FIG. 1 is block diagram of a process control system for an industrial plant that includes level gauges and/or ultrasonic flow meters which utilize Internet enabled distributed computing coupled to a cloud computing system for modeling, detailed calculation or calibration of the level gauge or ultrasonic flow meter, according to an example embodiment.

FIG. 1 is block diagram of a process control system 100 for an industrial plant (plant) 105 including processing equipment 114 that includes a disclosed $C^2D$ radar level gauge or ultrasonic flow meter 111 which utilizes Internet enabled distributed computing involving a cloud computing system 190 for historic data-based tracking, modeling, maintenance prediction, detailed calculation and/or calibration of the $C^2D$ radar level gauge or ultrasonic flow meter, according to an example embodiment. Cloud computing system 190 can also provide condition-based monitoring (CBM) obtained from processing of the IP protocol data and historic data to perform diagnostics and monitoring heath conditions of the $C^2D$ radar level gauge or $C^2D$ ultrasonic flow meter. The $C^2D$ radar level gauge or ultrasonic flow meter 111 is shown including a sensor 111a, a transducer 111b and communications 111c including for transmitting the sensed data.

The plant 105 can be a tank farm including a plurality of tanks or a pipeline metering station. The dotted lines shown indicate the possibility of using direct connectivity if those respective devices are IP-enabled devices by embedded or wireless universal serial bus (USB) enabled analogous to currently available television (TV) sets. All communication paths described herein including those shown in FIG. 1 utilize communication protocols in wired or wireless form.

The $C^2D$ level gauge or $C^2D$ ultrasonic flow meter 111 generally includes just a basic microcontroller (low cost and low power), with no DSP or FPGA or advanced ARM processor. An ARM processor is one of a family of CPUs based on the RISC (reduced instruction set computer) architecture developed by Advanced RISC Machines (ARM). No calculations unit is included, generally only to synchronize clocking and logic for data acquisition, temporary buffer storage and communications. However, a basic microcontroller should be configured to control actuators when computational results are fed back from the cloud computing system 190.

As known in communications, the IP suite is the computer networking model and set of communications protocols used on the Internet and similar computer networks commonly known as TCP/IP based on its most important protocols, the TCP, and the IP being the first networking protocols defined during its development. The IP communications can comprise, but is not limited to machine-to-machine (M2M)/IOT known as MQTT, Advanced Messaging Queuing Protocol (AMQP), and OPC UA.

Process data from the device layer 110 in the plant 105 is generally converted in real time from a serial protocol (e.g., Modbus) or other communication protocols in wired or wireless form to an IP communications unit which pushes the data directly to the client(s) by using a publish subscriber pattern. For example, in collaboration with an IP broker 145 comprising a MQTT broker and a data acquisition module 135, live data from the field devices including a disclosed $C^2D$ level gauge or $C^2D$ ultrasonic flow meter 111, or a basic sensor unit (e.g. T or P sensor) 112 in the device layer 110 of the plant 105 can be pushed to clients including the cloud computing system 190 by pulling the data on request or at selected time intervals, besides sending the data from the data acquisition module 135 to the process controller 130. Control information can also be pushed to actuators 113 which are also in the device layer 110, besides from the process controller 130.

MQTT is known to be low overhead, with only a 2-byte header for many messages. The MQTT design suits devices that are suspended (inactive) most of the time, with only occasional network activity. MQTT also has support for reliable delivery built into the protocol, so that simple sensors can simply flag an outgoing message as requiring confirmed delivery and let the IP broker 145 take care of delivery reattempts. Using a standard messaging protocol for all communication also significantly reduces the surface area for possible security vulnerabilities.

The data acquisition module 135 is coupled to receive data via bus 132 from the $C^2D$ level gauge or $C^2D$ ultrasonic flow meter 111, basic sensor unit 112 and actuator 113 in the device layer 110. For disclosed $C^2D$ radar level gauges, the data acquisition module 135 can comprise a Communication Interface Unit (CIU) type device without a need for computation capability just communications because all computations can be carried out remotely. For flow metering the data acquisition module 135 can be a flow computer or other type that has a communications interface without any calculations capability. The data acquisition module 135 can also comprise a Remote Terminal Unit (RTU) which is a modular and scalable controller capable of all remote automation and control applications. An RTU can facilitate communications, monitoring, diagnostic and asset management, such as for oil and gas applications.

The process controller 130 (e.g., microprocessor-based) is shown receiving data from the data acquisition module 135 and for sending control signals to the actuator 113. The data acquisition module 135 can comprise a device for scanning or polling the field data, with this module generally called a scanner. The scanner makes sure that the field data gets acquired regularly. A side task of the scanner is to raise events when the field devices are not responding for some reason. However, the field data can flow to the data acquisition module 135 in other ways. In another embodiment, instead of scanning the measured field data to scanned data, the field devices can be "smart" field devices programmed to deliver the field data regularly (at regular or predetermined intervals) to the data acquisition module 135. The data acquisition module 135 converts the measured field data into IP data. The data acquisition module 135 can comprise a smart Communication Interface Unit (CIU).

The data acquisition module 135 is shown coupled to an IP broker 145. In this embodiment the data acquisition module 135 converts the serial field data into IP data that is provided to the IP broker 145. The IP broker 145 is coupled by a connection provided by a permanently open IP network 138 to the cloud computing system 190. The cloud computing system 190 is shown including a processor 190a that has associated memory 190b. The IP communications over the IP network 138 provides end-to-end data communication specifying how data is packetized, addressed, transmitted, routed and received. As known in the art, this functionality is organized into four abstraction layers which are used to sort all related protocols according to the scope of networking involved. From lowest to highest, the layers are the link layer, containing communication methods for data that remains within a single network segment (link); the Internet layer, connecting independent networks, thus providing internetworking; the transport layer handling host-to-host communication; and the application layer, which provides process-to-process data exchange for applications.

The IP data output by data acquisition module 135 can as described above comprise MQTT data, AQMP data or OPC UA data. MQTT is an ISO standard (ISO/IEC PRF 20922) publish-subscribe-based "lightweight" messaging protocol for use on top of the TCP/IP protocol. AQMP stands for Advanced Message Queuing Protocol which is a wire-level protocol that is a description of the format of the data that is sent across the network as a stream of octets. OPC UA is an industrial M2M communication protocol for interoperability developed by the OPC Foundation.

The IP broker 145 has at least one memory (e.g., flash memory or SRAM) that stores the IP data arranged in a tree of topics. A topic is generally a simple string that can have more hierarchy levels, which may be separated by a slash. Clients can subscribe to an exact topic or use a wildcard. The IP broker 145 has a stored publisher/subscriber pattern in memory comprising a plurality of clients including at least a first client, such as a client at an operator station (see local control room 185 which includes operator stations) and/or in an application layer. Each client is subscribed by a published message to the IP broker 145 that includes at least a selected topic from the tree of topics. Publish/subscribe is event-driven and enables messages to be pushed to clients.

The IP broker 145 is the central communication point in charge of dispatching all messages between the senders (e.g., field devices) and the rightful receivers being clients such as cloud computing system 190. Each client that publishes a message to the IP broker 145 includes a topic into the message. The topic includes the routing information for the IP broker 145 to use. Each client that wants to receive messages subscribes to a certain topic and the IP broker 145 delivers all messages with the matching topic to the client. This architecture enables highly scalable solutions without dependencies between the data producers and the data consumers.

The cloud computing system 190 may comprise a server. The cloud computing system 190 receives the IP data from the IP broker 145 and performs advanced calculations, calibration, CBM and modeling on the IP data originating from the $C^2D$ level gauge or ultrasonic flow meter 111. For example, in the case of a $C^2D$ radar level gauge the cloud computing system 190 outputs at least an accurate level calculation. For example, in the case of a $C^2D$ ultrasonic flow meter, cloud computing system 190 outputs at least a high accuracy gas flow rate. Cloud computing system 190 may also provide predication modelling, data inter/extrapolation, curve fitting, least square regressions, fast Fourier transform (FFT)/or inverse FFT (IFFT), and other partial derivatives and partial differential equations.

Figure 2:
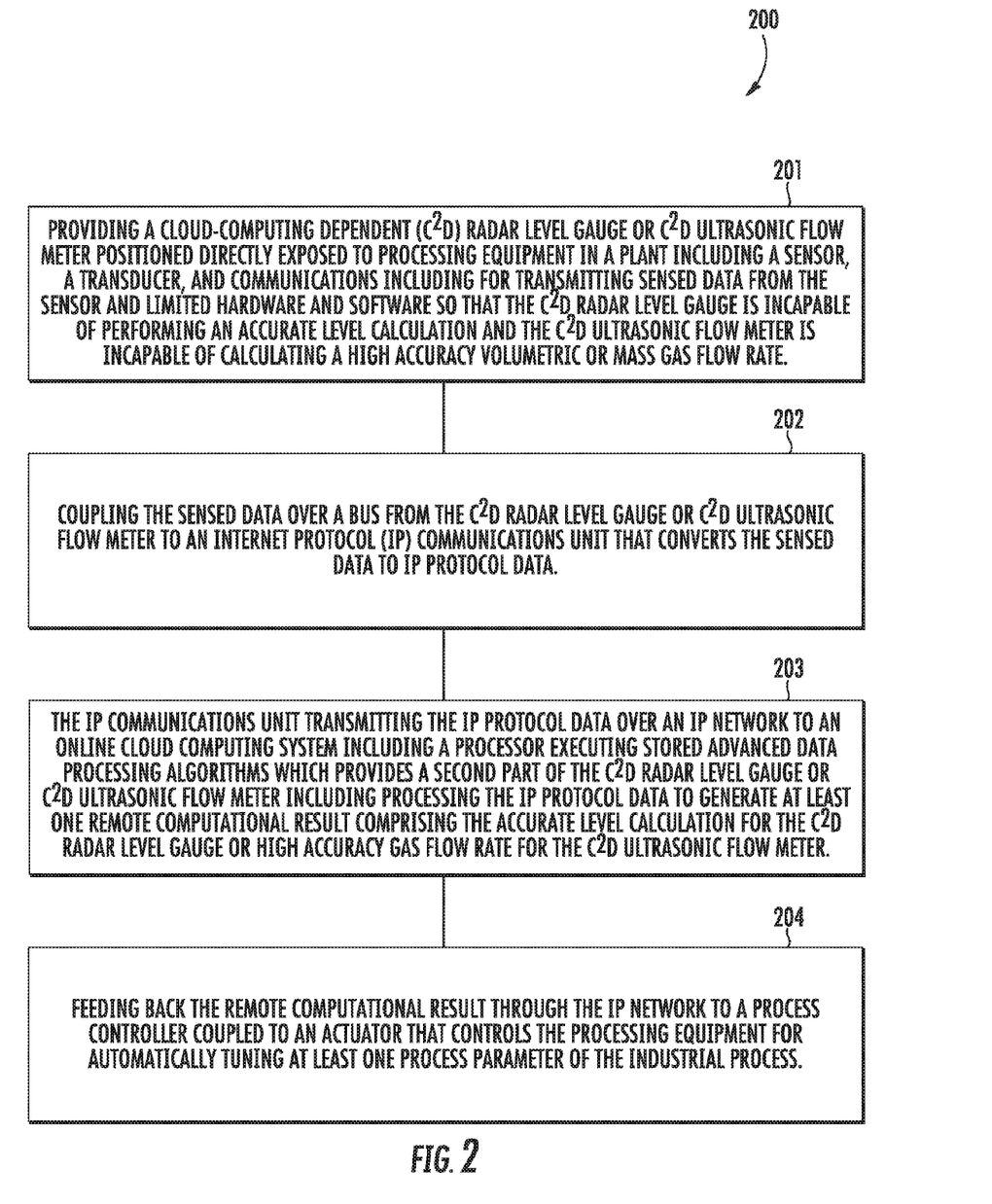
FIG. 2 is a flow chart that shows steps in a method of Internet enabled distributed computing involving cloud computing for modeling, detailed calculation or calibration of level gauges or ultrasonic flow meters, according to an example embodiment.

FIG. 2 is a flow chart that shows steps in a method 200 of Internet enabled distributed computing including disclosed $C^2D$ devices for controlling an industrial process run in a plant. Step 201 comprises providing a $C^2D$ radar level gauge or $C^2D$ ultrasonic flow meter positioned directly exposed to processing equipment in a plant including a sensor, a transducer, and communications including for transmitting sensed data from the sensor and limited hardware and software so that the $C^2D$ radar level gauge is incapable of performing an accurate level calculation and the $C^2D$ ultrasonic flow meter is incapable of calculating a high accuracy volumetric or mass gas flow rate. The $C^2D$ radar level gauge or $C^2D$ ultrasonic flow meter has hardware and software only sufficient to maintain basic functionality to output electrical or acoustic sensed data including from utilizing at most a basic data pre-processing. The basic data pre-processing can comprise a parametric calculation from a single equation.

Step 202 comprises coupling the sensed data over a bus from the $C^2D$ radar level gauge or $C^2D$ ultrasonic flow meter to an IP communications unit that converts the sensed data to IP protocol data. Step 203 comprises the IP communications unit transmitting the IP protocol data over an IP network to an online cloud computing system including a processor executing stored advanced data processing algorithms which provides a second part of the $C^2D$ radar level gauge or $C^2D$ ultrasonic flow meter including processing the IP protocol data to generate at least one remote computational result comprising the accurate level calculation for the $C^2D$ radar level gauge or high accuracy volumetric or mass gas flow rate for the $C^2D$ ultrasonic flow meter.

Step 204 comprises feeding back the remote computational result through the IP network to a process controller coupled to an actuator that controls the processing equipment for automatically tuning at least one process parameter of the industrial process. The method can also comprise feeding back a calculated calibration result through the IP network, and using the calibration result to automatically change at least one device configuration parameter for increasing the measurement accuracy of the radar level gauge or ultrasonic flow meter.

The remote computational result can further comprise computed information used for guiding generation of an updated online calibration in the cloud and then updating calibration coefficients to reflect real-time process conditions in the accurate level calculation for the $C^2D$ radar level gauge or gas velocity profiles in calculating the high accuracy gas flow rate for the $C^2D$ ultrasonic flow meter. The remote computational result can also comprises decision or forecasting information obtained from processing of the IP protocol data and historic data that is communicated back through the IP network via a control room of the plant to at least the actuator or a control device with similar controllable functions such as programmable logic controller (PLC) for tuning the industrial process. The tuning can be implemented by a feedback loop to tune the $C^2D$ radar level gauge or $C^2D$ ultrasonic flow meter to enable respective measurements in the industrial process to be more accurate and more reliable including under adverse conditions.

The remote computational result can also comprise condition-based monitoring (CBM) obtained from processing the IP protocol data and historic data to perform diagnostics and monitoring heath conditions of the $C^2D$ radar level gauge or $C^2D$ ultrasonic flow meter (which are directly exposed to process equipment). CBM provides early warning as well as maintenance schedule for necessary replacement of slowly deteriorated and performance decaying hardware components.

Figure 3A:
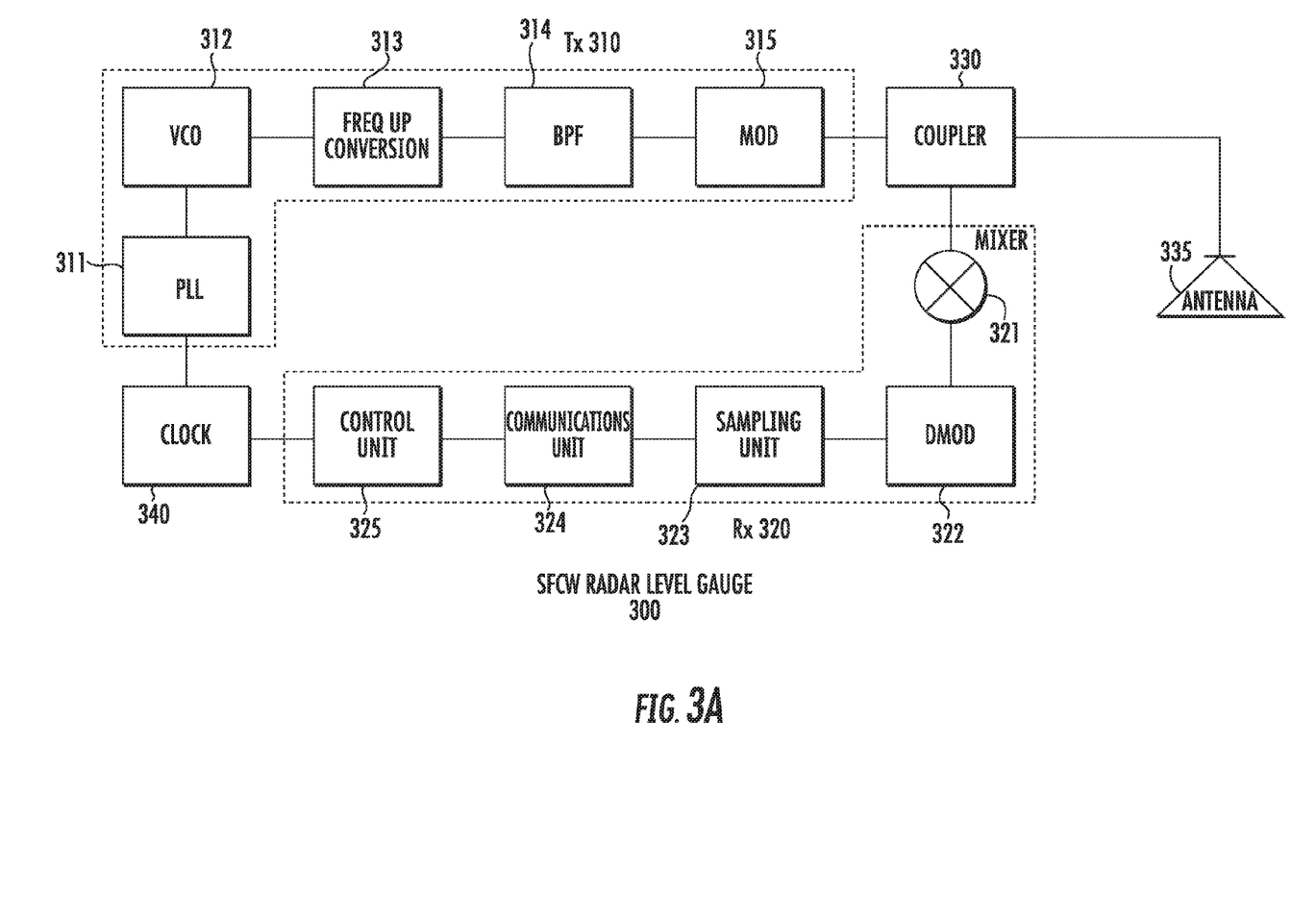
FIG. 3A is a simplified block diagram for an example C²D stepped frequency continuous wave (SFCW) type radar level gauge.

FIG. 3A is a simplified block diagram for an example $C^2D$ SFCW type radar level gauge (RLG) 300. RLG 300 includes front-end transmit (Tx) circuitry 310 and front-end receive (Rx) circuitry 320 by coupled to an antenna 335 by as coupler 330. Tx circuitry 310 is shown including in serial combination a phase lock loop (PLL) 311, and voltage controlled oscillator (VCO) 312, a frequency up-converter 313, band pass filter (BPF) 314 and a modulator 315. Rx circuitry 320 is shown including in serial combination a mixer 321, demodulator 322, sampling unit 323, communications unit 324 and control unit 325. A clock 340 is coupled to PPL 311 and to the control unit 325. The communications unit 324 can comprises a processor such as a microcontroller, while another processor such as a microcontroller is in the control unit 325. The basic calculation is performed within communications unit 324. Not shown is a power supply, such as a rechargeable battery with energy harvesting for deployments in remote areas.

Figure 3B:
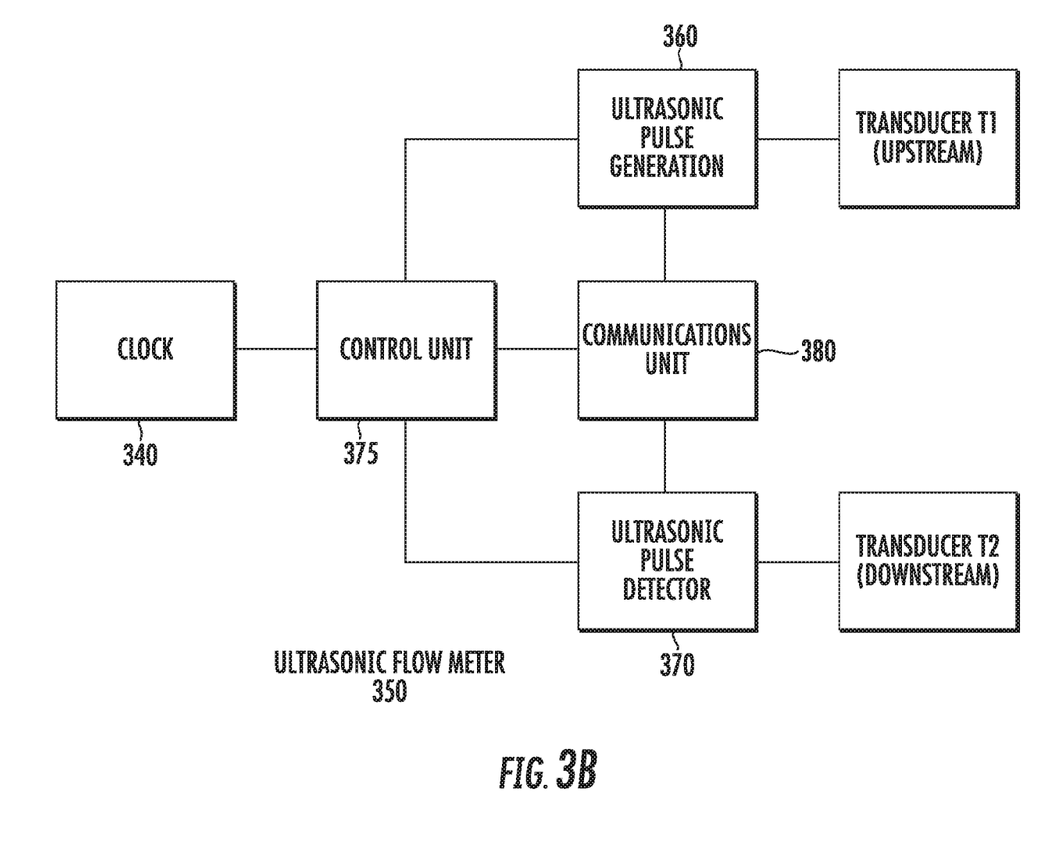
FIG. 3B is a simplified block diagram for an example C²D direct or reflective path ultrasonic flow meter which determines the time of flight (TOF) from one transducer to the other in a pair.

FIG. 3B is a simplified block diagram for an example $C^2D$ direct or reflective path ultrasonic flow meter 350 which determines the TOF from one ultrasonic transducer T1 (upstream/transmit) to the other ultrasonic transducer T2 (downstream/receive) or vice versa, i.e., upstream/receive and downstream/transmit in a pair. Flow meter 350 includes an ultrasonic pulse generation drive unit 360 coupled to T1 and an ultrasonic pulse detector 370 coupled to T2. A communications unit 380 is coupled to the ultrasonic pulse generation drive 360 and ultrasonic pulse detector 370. Communications unit 380 comprise a process such as a microcontroller that can perform only a very basic calculation. Flow meter 350 also includes a control unit 375 and a clock 340. Not shown is a power supply, such as a rechargeable battery with energy harvesting, for deployments in remote areas.

Advantages of disclosed Internet enabled distributed computing for fluid level gauging and flow metering include reducing the onboard device hardware cost and design complexity. Disclosed Internet enabled distributed computing can use a common communication protocol for all $C^2D$ devices. It is also easy to maintain revision or complete change of algorithms in the cloud for one family of all sensor devices concerned. The fluid level gauging and ultrasonic flow metering devices are safer through the cloud computing system 190 (e.g., cloud server) and prevented from illegal imitating by obtaining the fluid level gauging and flow metering device and doing reverse engineering. This arrangement not only enables online computing and abnormality detection, but also makes it possible to refine other functions and existing parameters, or creating new parameters and get them updated according to the real-time conditions/scenarios.

Disclosed Internet enabled distributed computing for fluid level gauging and flow metering can be applied to generally a wide variety of industrial process control systems (or plants) including oil or gas pipelines, refineries and petrochemical facilities, as well as aerospace and transportation systems. Custody transfer in the oil and gas industry is one example application.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

The invention claimed is:

1. A method of distributed computing for controlling an industrial process, comprising:

providing a cloud-computing dependent ($C^2D$) radar level gauge or $C^2D$ ultrasonic flow meter positioned directly exposed to processing equipment in a plant including a sensor, a transducer, and communications including for transmitting sensed data from said sensor and limited hardware and software so that said $C^2D$ radar level gauge is incapable of performing an accurate level calculation and said $C^2D$ ultrasonic flow meter incapable of calculating a high accuracy volumetric or mass gas flow rate;

coupling said sensed data over a bus from said $C^2D$ radar level gauge or said $C^2D$ ultrasonic flow meter to an Internet Protocol (IP) communications unit that converts said sensed data to IP protocol data;

said IP communications unit transmitting said IP protocol data, over an IP network to an online cloud computing system including a processor executing stored advanced data processing algorithms which provides a second part of said $C^2D$ radar level gauge or said $C^2D$ ultrasonic flow meter including processing said IP protocol data to generate at least one remote computational result comprising said accurate level calculation for said $C^2D$ radar level gauge or said high accuracy volumetric or mass gas flow rate for said $C^2D$ ultrasonic flow meter, and feeding back said remote computational result through said IP network to a process controller coupled to an actuator that controls said processing equipment for automatically tuning at least one process parameter of said industrial process; and forecasting information obtained from processing of said IP protocol data and historic data that is communicated back through said IP network via a control room of said plant to at least said actuator or a control device with similar controllable functions to said actuator for tuning said industrial process.

2. The method of claim 1, further comprising an IP broker having a memory that stores said IP protocol data arranged in a tree of topics positioned between said IP communications unit and said IP network.

3. The method of claim 1, wherein said $C^2D$ radar level gauge or said $C^2D$ ultrasonic flow meter comprises said $C^2D$ radar level gauge.

4. The method of claim 1, wherein said $C^2D$ radar level gauge or said $C^2D$ ultrasonic flow meter comprises said $C^2D$ ultrasonic flow meter.

5. The method of claim 1, wherein said remote computational result further comprises computed information used for guiding generation of an updated online calibration and then updating calibration coefficients to reflect real-time process conditions in said accurate level calculation for said $C^2D$ radar level gauge or gas velocity profiles in calculating said high accuracy volumetric or mass gas flow rate for said $C^2D$ ultrasonic flow meter.

6. The method of claim 5, wherein said tuning is implemented by a feedback loop to tune said $C^2D$ radar level gauge or said $C^2D$ ultrasonic flow meter to measure said industrial process more accurately and more reliably.

7. The method of claim 1, wherein said remote computational result comprises condition-based monitoring (CBM) obtained from processing of said IP protocol data and historic data to perform diagnostics and monitoring heath conditions of said $C^2D$ radar level gauge or for said $C^2D$ ultrasonic flow meter.

8. A process control system for controlling an industrial process run in a plant using distributed computing, comprising:

a cloud-computing dependent ($C^2D$) radar level gauge or $C^2D$ ultrasonic flow meter positioned directly exposed to processing equipment in said plant including a sensor, a transducer, and communications unit including for transmitting sensed data from said sensor and limited hardware and software so that said $C^2D$ radar level gauge is incapable of performing an accurate level calculation and said $C^2D$ ultrasonic flow meter incapable of calculating a high accuracy volumetric or mass gas flow rate;

a bus for coupling said sensed data from said $C^2D$ radar level gauge or said $C^2D$ ultrasonic flow meter to an Internet Protocol (IP) communications unit that converts said sensed data to IP protocol data; cloud computing system coupled by an IP network to receive said IP protocol data from said IP communications unit, said cloud computing system including a processor executing stored advanced data processing algorithms which provides a second part of said $C^2D$ radar level gauge or said $C^2D$ ultrasonic flow meter including processing said IP protocol data to generate at least one remote computational result comprising said accurate level calculation for said $C^2D$ radar level gauge or said high accuracy volumetric or mass gas flow rate for said $C^2D$ ultrasonic flow meter, and wherein said cloud computing system feeds back said remote computational result through said IP network to a process controller coupled to an actuator that controls said processing equipment for automatically tuning at least one process parameter of said industrial process, and wherein said remote computational result comprises forecasting information obtained from processing of said IP protocol data and historic data that is communicated back through said IP network via a control room of said plant to at least said actuator or a control device with similar controllable functions to said actuator for tuning said industrial process.

9. The process control system of claim 8, wherein said $C^2D$ radar level gauge or said $C^2D$ ultrasonic flow meter comprises said $C^2D$ radar level gauge.

10. The process control system of claim 8, wherein said $C^2D$ radar level gauge or said $C^2D$ ultrasonic flow meter comprises said $C^2D$ ultrasonic flow meter.

11. The process control system of claim 8, further comprising an IP broker having a memory that stores said IP protocol data arranged in a tree of topics positioned between said IP communications unit and said IP network.

12. The process control system of claim 8, wherein said remote computational result further comprises computed information used for guiding generation of an updated online calibration and then updating calibration coefficients to reflect real-time process conditions in said accurate level calculation for said $C^2D$ radar level gauge or gas velocity profiles in calculating said high accuracy volumetric or mass gas flow rate for said $C^2D$ ultrasonic flow meter.

13. The process control system of claim 12, wherein said tuning is implemented by a feedback loop to tune said $C^2D$ radar level gauge or said $C^2D$ ultrasonic flow meter to measure said industrial process more accurately and more reliably.

14. The process control system of claim 8, wherein said remote computational result comprises condition-based monitoring (CBM) obtained from processing of said IP protocol data and historic data to perform diagnostics and monitoring heath conditions of said $C^2D$ radar level gauge or said $C^2D$ ultrasonic flow meter.

* * * * *